May 27, 1924.

W. J. STEWART 1,495,269

ADJUSTABLE FEEDING TROUGH FOR POULTRY BATTERIES

Original Filed March 30, 1922

William J. Stewart,
Inventor

By his Attorneys, Dodson & Roe

Patented May 27, 1924.

1,495,269

UNITED STATES PATENT OFFICE.

WILLIAM J. STEWART, OF CLINTON, IOWA.

ADJUSTABLE FEEDING TROUGH FOR POULTRY BATTERIES.

Original application filed March 30, 1922, Serial No. 548,181. Divided and this application filed November 15, 1922. Serial No. 601,034.

*To all whom it may concern:*

Be it known that I, WILLIAM J. STEWART, a citizen of the United States, residing in the city of Clinton, county of Clinton, and State of Iowa, have invented a certain new and useful Improvement in Adjustable Feeding Troughs for Poultry Batteries, of which the following is a specification.

My invention relates to that class of devices which are described in my co-pending application Serial #548181 now Patent No. 1,458,736 issued June 12, 1923, of which this application is a division, and has for its object to provide an adjustable feeding trough which will accommodate poultry of various sizes and ages and has for its further object to provide supports for the feeding troughs which in addition to being vertically adjustable, swing inwardly into such a position that the supports will not project beyond the sides of the battery, thus greatly facilitating the shipment of the battery, and avoiding the danger of their being broken off, which frequently happens in use.

My means of accomplishing the foregoing objects may be more readily understood by having reference to the accompanying drawings which are hereunto annexed and form a part of the specification in which.

Similar reference numerals refer to similar parts throughout the entire description.

Figure 1:
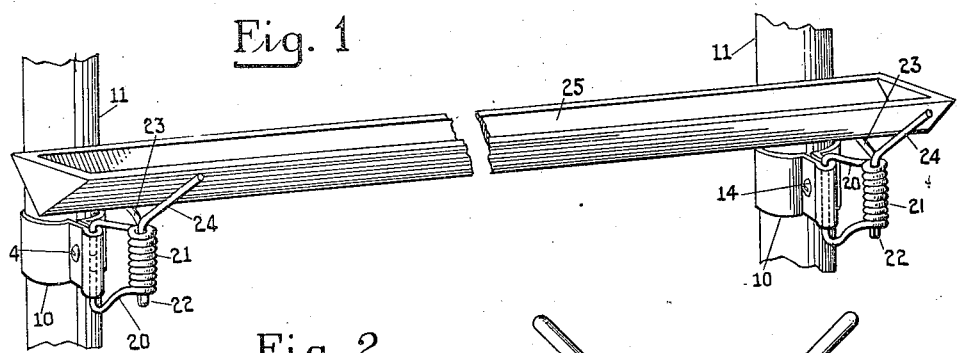
Fig. 1 is a perspective view of my improved supports attached to the uprights of a poultry feeding battery, a fragmentary portion of the latter only being shown.
Figure 2:
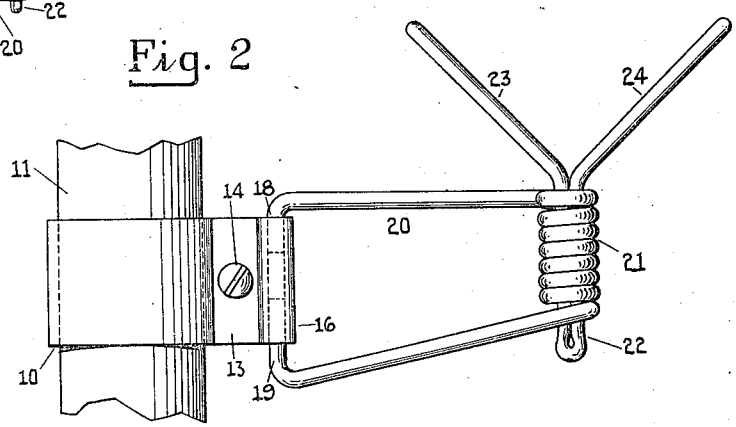
Fig. 2 is a detail view of my support.
Figure 3:
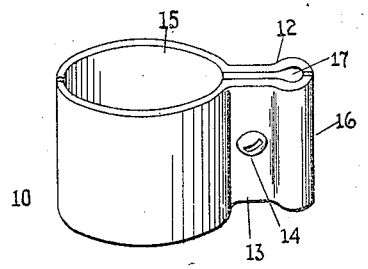
Figs. 3 and 4 are enlarged detail views of the device a part of the swinging member being shown in section in Fig. 4.

As shown in the drawings, my trough support comprises a plurality of clamps 10 which are designed to be bolted upon uprights 11 which are a part of the poultry feeding battery (not shown). As illustrated, the clamps 10 are formed in two pieces, 12 and 13 which are clamped together by means of screws or bolts 14. When clamped together they provide a vertical cylindrical portion 15 which is adapted to and does encircle the uprights 11 of the poultry feeding battery.

As illustrated, these are round but it will be apparent to persons skilled in the art that the particular configuration of the upright to which the bracket is clamped is not at all material.

A vertical sleeve 16 is formed at the extremity of the bracket 10, the cylindrical opening 17 therein, passing therethrough.

In this bearing, I mount the ends 18 and 19 of a swinging bracket 20, which is formed of wire and has a plurality of coils 21 at its outer end. This construction permits the bracket 20 to swing freely in the vertical bearing 17.

Figure 4:
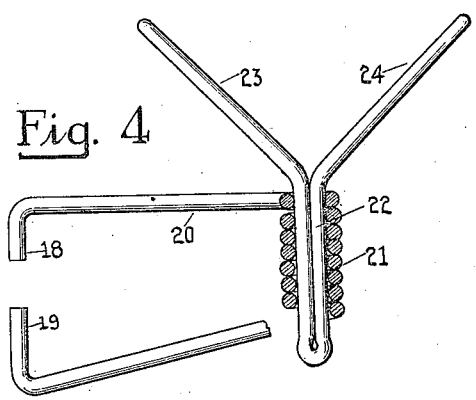

A wire crotch 22 which is conveniently formed by bending a wire upon itself as shown in Fig. 4 is mounted in the coils 21. Its upper arms 23 and 24 are diverging and thus serve to support the feed trough 25.

It is apparent that inasmuch as the brackets 20 swing freely upon the clamp 10, that the trough supporting crotch 22 can be swung upon uprights so as to be inside of them, thus preventing any possibility of their being broken off.

The operation of the device is as follows:

The user, having determined the size or age of the chickens which are to be shipped in the battery, and which will have to be fed, may by loosening the screw 14 move the clamps 10 up or down as the requirement may be. When by tightening the screw 14, when the clamp 10 is in the desired place, the wire crotch will support the trough 25 in the required position.

Although I have shown and described a specific form of construction, it will be obvious that changes in the specific construction and configuration may be made and I do not desire to be limited to the details thus illustrated except as such limitations may appear in the hereinafter appended claims.

Having described my invention what I regard as new and desire to secure by Letters Patent, is:

1. The combination with a poultry feeding battery of an adjustable feeding trough support, comprising detachable clamps, having vertical bearings therein, swinging brackets formed of wire, the ends of which extend into said bearings, a wire crotch carried by said swinging bracket.

2. The combination with a poultry feeding battery of a plurality of detachable clamps, means to secure said clamps in a predetermined position, vertical bearings of said clamps, wire brackets, the ends of which are mounted in said bearings, a plurality of coils formed in said wire, a trough supporting crotch formed of wire, mounted in said coils.

3. The combination with a poultry feeding battery of an adjustable feeding trough support, comprising a plurality of detachable clamps, swinging brackets formed of a wire having a plurality of coils therein, secured to said clamps, trough supports carried in said coils.

4. The combination with a poultry feeding battery of an adjustable feeding trough support, comprising a plurality of detachable clamps, vertical bearings therein, swinging brackets, in said bearings, said brackets being formed of wire, having a plurality of coils in the outer end and a wire crotch mounted in said coils.

In testimony whereof, I have signed the foregoing specification.

WILLIAM J. STEWART.